United States Patent
Scholz et al.

(10) Patent No.: US 6,689,959 B1
(45) Date of Patent: Feb. 10, 2004

(54) WEIGHING DEVICE

(75) Inventors: Rita Scholz, Gorxheimertal (DE); Olaf Scholz, Oberflockenbach (DE); Martin Breuer, Lindlar (DE); Franz Höck, Overath (DE); Bernhard Kohnen, Köln (DE); Thomas Bezouska, Laudenbach (DE); Peter Engelhardt, Hemsbach (DE)

(73) Assignee: Temafa Maschinenfabrik GmbH, Seefeld-Hechendorf (DE)

( * ) Notice: Subject to any disclaimer, the term of this patent is extended or adjusted under 35 U.S.C. 154(b) by 0 days.

(21) Appl. No.: 09/763,113

(22) PCT Filed: May 16, 2000

(86) PCT No.: PCT/DE00/01553

§ 371 (c)(1),
(2), (4) Date: Oct. 19, 2001

(87) PCT Pub. No.: WO00/73546

PCT Pub. Date: Dec. 7, 2000

(30) Foreign Application Priority Data

May 27, 1999 (DE) .......................................... 199 24 203

(51) Int. Cl.$^7$ .......................... G01G 11/14; D01G 15/40
(52) U.S. Cl. .......................... 177/16; 177/116; 177/119; 177/145; 177/164; 177/171; 19/105; 19/300
(58) Field of Search .......................... 177/116–122, 145, 177/16, 164, 170, 171; 19/105, 300

(56) References Cited

U.S. PATENT DOCUMENTS

| | | | | | |
|---|---|---|---|---|---|
| 3,133,608 | A | * | 5/1964 | Lau | 177/118 |
| 3,656,337 | A | * | 4/1972 | McDonald | 177/119 |
| 4,133,455 | A | | 1/1979 | Moser | 222/77 |
| 4,139,070 | A | * | 2/1979 | Hanson et al. | 177/200 |
| 4,206,823 | A | * | 6/1980 | Krull | 177/121 |
| 4,574,297 | A | | 3/1986 | Ooi | 357/68 |
| 5,384,436 | A | * | 1/1995 | Pritchard | 177/145 |
| 5,479,679 | A | | 1/1996 | Leifeld | 19/105 |
| 5,511,571 | A | * | 4/1996 | Adrezin et al. | 177/244 |
| 5,611,116 | A | | 3/1997 | Leifeld | 19/105 |
| 5,802,674 | A | | 9/1998 | Barber | 19/105 |

FOREIGN PATENT DOCUMENTS

| | | |
|---|---|---|
| DE | 1236381 | 3/1967 |
| DE | 1549214 | 9/1970 |
| DE | 2248522 | 4/1974 |
| FR | 1260644 | 12/1961 |
| FR | 2641290 | 7/1990 |

* cited by examiner

Primary Examiner—Randy Gibson
(74) Attorney, Agent, or Firm—Dority & Manning

(57) ABSTRACT

A weighing device for the determination of weight of a fiber material is provided. The weighing device includes multiple weighing arms. Each of the weighing arms is pivotably supported on one end. Also, each of the weighing arms is supported on an opposite end by a weighing element. The weighing arms are configured for supporting and transporting the fiber material. The weighing element provides a signal for the determination of weight of the fiber material.

14 Claims, 3 Drawing Sheets

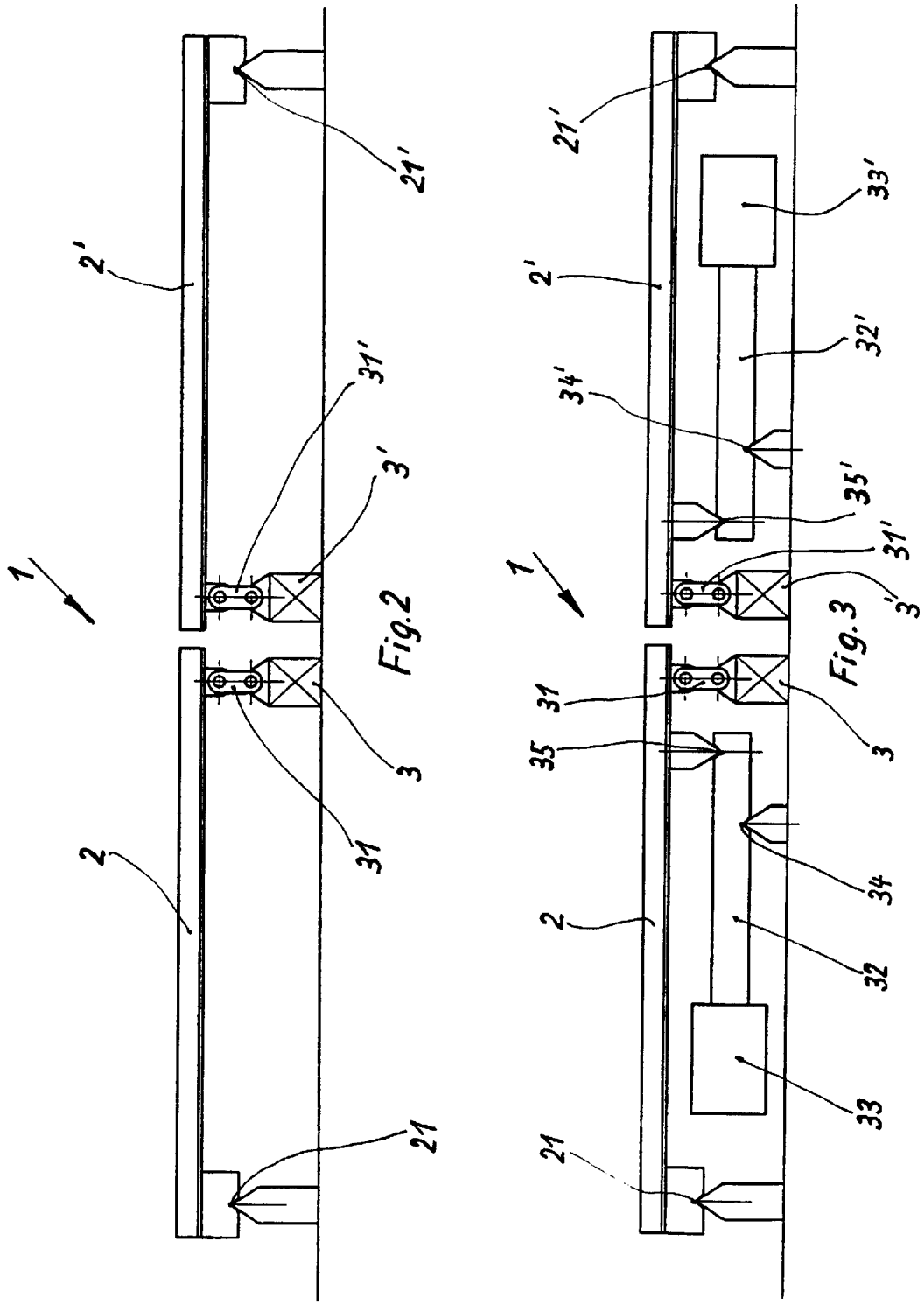

WEIGHING DEVICE

BACKGROUND

The invention concerns a weighing device for the continuous determination of the weight per unit area of fiber material running as a band or as matting, which is delivered out of a preceding machine or from a fiber material container to the weighing device. The material leaves the weighing device to enter a subsequent fiber working machine or fiber material storage facility.

Weighing apparatuses of this kind, as they, are known in the art, show great variation in design. The fiber material is conducted on an essentially horizontal transport belt, beneath which the weighing apparatus is placed. In EP 0 635 589 A1 an electronic belt weigher is described, which precedes the intake apparatus of a carding machine or the like. The fiber mat resulting therefrom is discharged onto an endless, running belt leading to the intake apparatus of the carding machine. In the midsection of this running belt, which carries the fiber mat, is located a measurement device. This measurement device determines the weight of the fiber mat on a given weighing stretch. By use of a "set-point vs. actual" comparison, the belt speed, which is the mat velocity, is controlled so that added spinning material matches a desired weight per unit area or band weight of the finished product. The set value for the surface or fiber band weight can relate itself to the output of one of successive fiber processing machines. One of these machines can be for instance, a matting band layering machine.

This type of band-weight determination is prone to error in that the loading of the weighing device under the transport belt is affected by the elasticity and the tension of the belt as it transports the fiber band.

In order to avoid this fault and to render the weighing apparatus independent of the feed and removal of the material to be weighed, patent number DE 39 13 733 A1 proposes to make the support belt with the weighing device independent from the feed table. The patent attempts to do this in such a manner that the support belt with its drive apparatus along with the spinning goods carried thereon is weighed. Upon subtraction of the tare, the weight of the spinning goods can be determined. Following the weighing belt, but independent thereof, is a subsequent feed table for the next machine.

Experience has shown that this arrangement is not satisfactory. One reason is that upon the transport of fiber mass in the form of a precompressed matting or band, bridge formations appear at the transitions between the transport belt of the feed table and the weighing belt as well as at the subsequent transport belt. This bridge formation has the effect of giving support to the fiber mass in the transition zone at the neighboring transport element. The results of the measurement are falsified in that the fiber mass which is on the transport belt can support itself by its own fiber friction and clinging characteristics at these transition points of the incoming or outgoing fiber mats. Therefore, the entire true weight does not react on the weighing apparatus.

A further factor influencing weight determination with known weighing apparatuses at transition points between the incoming and outgoing fiber mats to and from the weighing belt is the uniformity of the material which is found in this zone. If the material which is to be weighed between these transition points has the same density, then an effective weight reference necessary to match the actual length of the weighing belt can be determined by a series of measurements. However, if the material is not uniform within the transition points, then the weight which is recorded as a ratio of the length of the laid down material on the weighing belt to the reference length also changes. Placing a correction on the inconsistence of uniformity in the case of known weighing apparatuses is not possible since a constant feed drive control for the feed of material is only workable with uniform material.

The purpose of the present invention is to create a band or matting weighing device which avoids the disadvantage of the formation of bridging and the weighing errors caused by this formation.

SUMMARY OF THE INVENTION

Objects and advantages of the invention will be set forth in part in the following description or may be obvious from the description, or may be learned through practice of the invention.

One exemplary embodiment of the present invention provides for a weighing device for the determination of weight of a fiber material. The weighing device includes two weighing arms, each of which are pivotably supported on one end. Each of the weighing arms are supported on an opposite end by a weighing element. The weighing arms are configured for supporting and transporting the fiber material. The weighing element provides a signal for the determination of the weight of the fiber material.

The present invention also encompasses a weighing device used for the continuous determination of weight per unit area:of fiber material. The weighing device is located downstream from a fiber working machine or a fiber material container that transports the fiber material to the weighing device. Also, the weighing device is located upstream from a fiber working machine or a fiber material storage apparatus to which fiber material is transported from the weighing device. The weighing devices includes two weighing arms that are both rotationally supported on one end by an axle. A feed apparatus is present and is located proximate to the rotationally supported end of one of the weighing devices. Also included is a removal apparatus that is located proximate to the rotationally supported end of another of the weighing arms. A weighing element is present which supports the end of the weighing arms opposite from the end of the weighing arms that are rotationally supported.

Another exemplary embodiment of the present invention exists in a process for the continuous determination of the surface weight of fiber material. The process includes the step of transporting the fiber material over two weighing arms which are supported by a weighing element on the two ends of the weighing arms that are proximate to one another. The process also includes the step of determining the weight that is lying on each of the weighing arms. Further, the process includes the step of the determination of the surface weight by taking the arithmetical average of the two measured values.

The present invention also encompasses the weighing device as discussed above where each of the weighing arms has a separate weighing element supporting the ends of the weighing arms.

Additionally, the present invention also includes an exemplary embodiment of a weighing device as discussed above which further has a transport belt located on the weighing arms. The transport belt accepts the fiber material from the feed apparatus and transports the fiber material to the removal apparatus.

Alternatively, the present invention includes an exemplary embodiment of a weighing device as discussed above where each of the weighing arms has a transport belt for transporting the fiber material and each of the transport belts has a turn-around roll. The weighing arms are rotatable about each respective turn-around roll.

Also provided according to the present invention is a weighing device as discussed above which further has a compensating balance on each of the weighing arms to counterbalance the weight of the weighing arms.

A further exemplary embodiment of the present invention exists in a weighing device as immediately discussed where the compensating balance has a compensation weight. The compensation weight is located thereon in order to compensate for the weight of the weighing arms.

Additionally, the present invention includes an exemplary embodiment of a weighing device as previously discussed where the axle is a stationary knife edge support.

BRIEF DESCRIPTION OF THE DRAWINGS

Further details of the invention are explained with the aid of the drawings. There is shown in.

DETAILED DESCRIPTION

Figure 1:
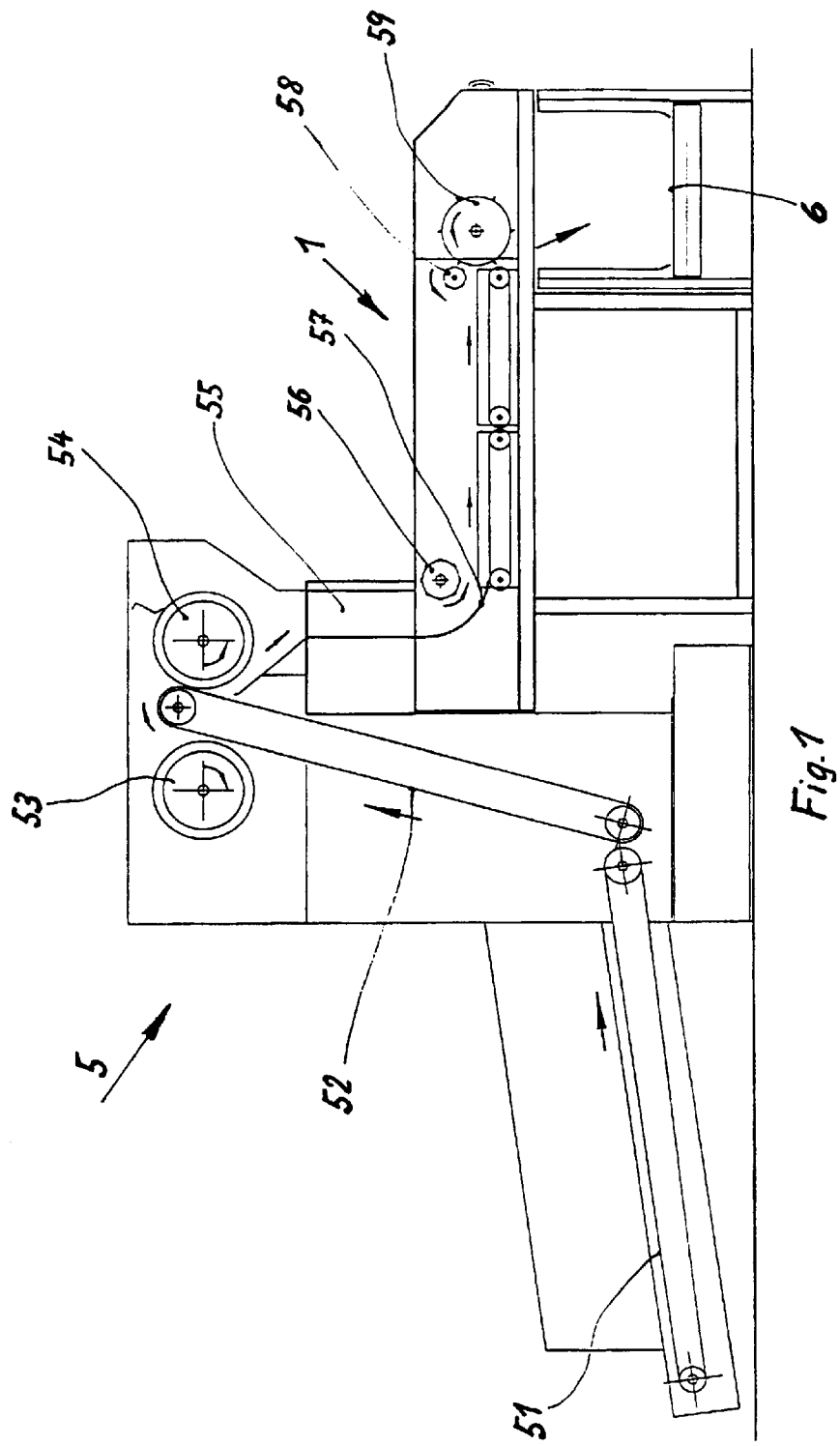
FIG. 1 the weighing device in accord with an exemplary embodiment of the invention connected to a feed hopper in a schematic presentation, FIG. 2 the functional principle of the weighing device, FIG. 3 the functional principle of the weighing device with compensation of the weight of the weighing arms, and FIG. 4 the weighing device in accord with FIG. 3, arranged at the discharge end of a hopper.

Reference will now be made in detail to embodiments of the invention, examples of which are shown in the drawings. Each example is provided by way of explanation of the invention, and not meant as a limitation of the invention. For example, features illustrated or described as part of one embodiment may be used on another embodiment to yield still a third embodiment. These and other modifications and variations are within the scope and spirit of the present invention.

In accord with an exemplary embodiment of the present invention shown in FIG. 1, the weighing device is shown at the discharge end of a hopper feeder 5. Here, the fiber material is conveyed over a feed table 51 to an ascending conveyor belt 52. An evener-roller 53 fulfills its function in that the fiber material is forwarded in defined quantities and in a sufficiently loose status through the discharge roll 54 of a feed shaft 55. At the lower discharge opening of the feed shaft 55 a feed roll 56 is placed. The feed roll 56 sends the fiber material over a feed plate 57 in a compressed form to a weighing device 1. By this operation, the weight per unit area is controlled so that the removal roll 58 sends a continually uniform quantity of fiber material to the take-away roll 59. Thereafter, the material is discharged onto the transport belt 6. This transport belt 6 conducts the fiber material to a further fiber working process.

FIG. 2 schematically presents the principle of the weighing device 1. A weighing arm 2 is placed in transport connection with the feed roll 56 and the feed pan 57, but is physically separate from both. The weighing arm 2 is supported on a stationary knife edge 21. The other end of the weighing arm 2 supports itself on a weighing element 3. The weighing arm 2 is connected by a linked support 31 with the weighing element 3. In mirror image to the disposition of weighing arm 2, another weighing arm 2' is placed. Weighing arm 2' supports itself likewise on a weighing element 3' by means of a linked support 31'. On its other end, weighing arm 2' is likewise supported by a stationary knife edge 21'. At this supported end of the weighing arm 2' a removal roll 58 is present which in conjunction with a take-away roll 59 ejects the fiber material onto a transport belt 6 for further working. As is shown in FIG. 4, instead of a removal roll 58 and a take-away roll 59, it is also possible to have a removal roll-pair 58 and 58' incorporated.

FIG. 3 depicts another exemplary embodiment of the weighing device 1. Here, the weighing device is provided with a compensatory apparatus to balance the weight of the weighing arm 2, 2'. This apparatus is a balance beam 32 which pivots on a stationary knife edge 34 leaving some beam length to react against a counter knife edge 35 on the weighing arm 2. Balancing of the weight of the weighing arm 2 is carried out by the compensation weight 33. This compensation weight 33 is adjustable on the balance beam 32, or made to match the compensating weight of the weighing arm 2 by means known in the art. Because of this compensation, the weighing element 3 need assume only the true fiber material weight and can be made essentially more sensitive than if the complete weighing arm 2 with its own weight additionally burdened the weighing element 3.

Figure 4:
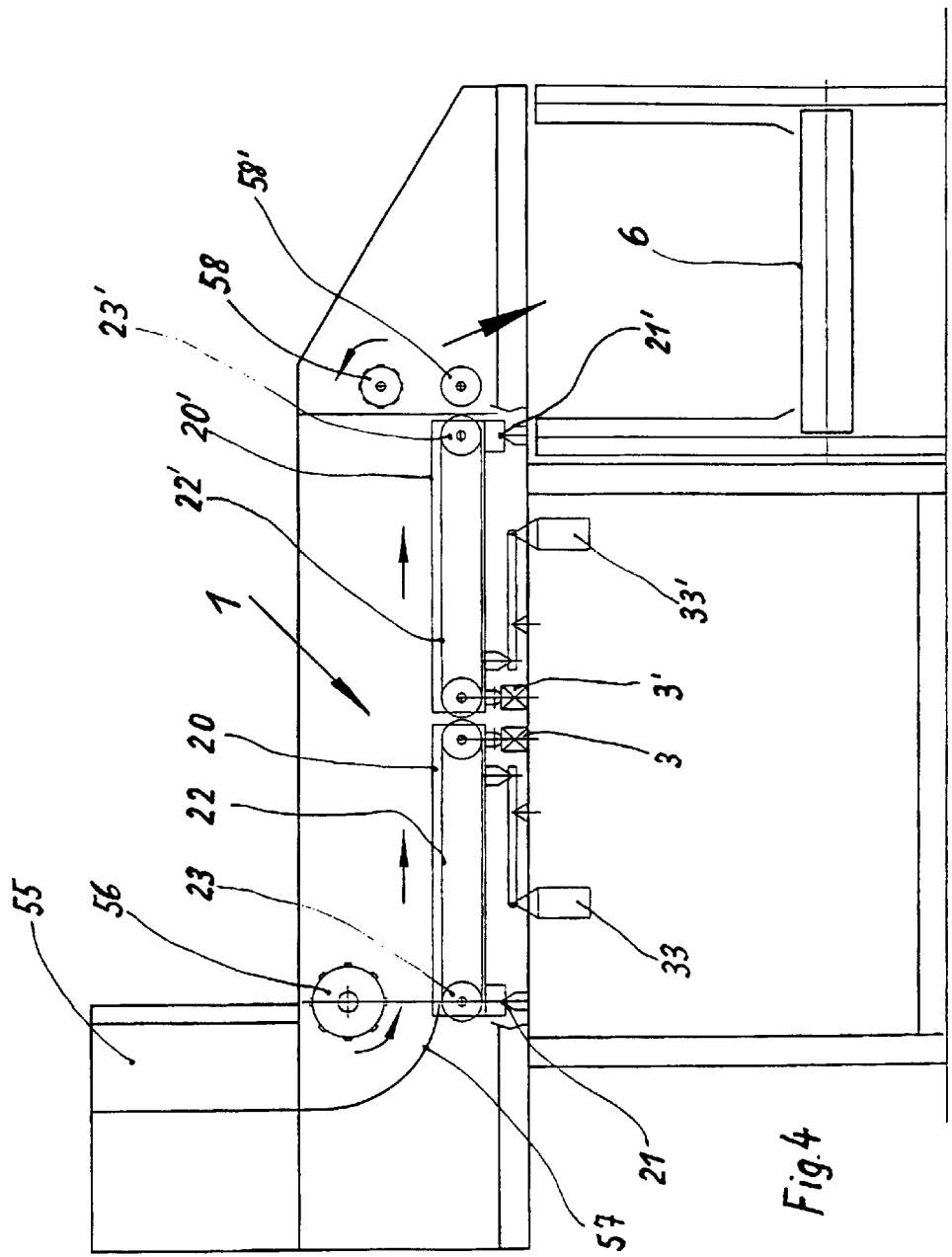

Fundamentally, the weighing arm 2 can be designed as a slide surface for the fiber material, however it is more advantageous as shown in FIG. 1 or FIG. 4 to provide thereon a transport belt 22. The transport belt 22 loops over the turn-around roller 23 and is driven by this roller 23. In this manner, the fiber material obtains transport movement by means of the transport belt 22 so that no horizontal forces can enter under certain circumstances to effect the weighing. Horizontal forces may occur under certain circumstances in a design based on a sliding surface. One end of the weighing arm 20 can be rotationally supported by the axle of the turn-around roll 23 (see FIG. 1) or alternately be supported on a stationary knife edge 21. The feed roll 56 is located above this stationary knife edge 21 and serves to convey the fiber material out of the hopper 55 onto the transport belt 22. Inclusion of the axle of the turn-around roll 23, or alternately the knife edge 21, provides for a stationary support of the weighing arm 20. This prevents the pressure of the fiber compacting feed roll 56 from acting upon the weighing device. This positioning of the weighing arm 20 causes the inevitable bridge formation to not effect the weighing result.

From the transport belt 22, the fiber material is then transferred to the second transport belt 22' of the weighing device 1 and conducted to the removal roll 58, or the removal roll-pair 58, 58'. The formation of bridging cannot be avoided either at the fiber transfer from the transport belt 22 to the transport belt 22', nor at the removal roll 58 or the removal roll-pair 58, 58'. However, exactly as in the case of the feed roll 56, because of the stationary support of the weighing arm 20' the material removal has no effect on the measurement result. At the same time, upon the transition from the transport belt 22 to the transport belt 22', the weighing elements (3, 3') now weigh the bridging. This is because the fiber material mat of the belt 22 is only supported on the weight-sensitive zone of the other transport belt 22' so that the average of the two measured values present the true value without bias from the bridge build up. In accord with the respective determined weight, the regulation of the material transport speed in the area of the material feed is then carried out in a conventional manner.

It should be understood that the invention includes various modifications that can be made to the embodiments of the weighing device described herein as come within the scope of the appended claims and their equivalents.

What is claimed is:

1. A weighing device for determination of weight of a fiber material comprising:

at least two weighing arms, each of said weighing arms being stationarily pivotably supported on one end at a stationarily fixed pivot point, and each of said weighing arms being supported on an opposite end by a separate respective weighing element, said weighing arms configured for supporting and transporting the fiber material, each respective said weighing element providing a signal for the determination of weight of the fiber material.

2. The weighing device of claim 1, further comprising:

a feed apparatus proximate to said pivotably supported end of one of said weighing arms, said feed apparatus used for the transporting of the fiber material; and a removal apparatus on said pivotably supported end of the other of said weighing arms, said removal apparatus transporting the fiber material from said weighing device.

3. The weighing device of claim 1, wherein said weighing arms are linkably engaged with said weighing element.

4. The weighing device of claim 2, further comprising a transport belt located on said weighing arms, said transport belt accepts the fiber material from said feed apparatus and transports the fiber material to said removal apparatus.

5. The weighing device of claim 1, wherein each of said weighing arms has a transport belt for transporting the fiber material, said transport belts each have a turn-around roll, and said weighing arms are rotatable about each respective said turn-around roll.

6. The weighing device of claim 1, further comprising a compensating balance on each of said weighing arms to counterbalance the weight of said weighing arms.

7. The weighing device of claim 6, wherein said compensating balance has a compensation weight located thereon in order to compensate for the weight of said weighing arms.

8. A weighing device for continuous determination of weight per unit area of fiber material, said weighing device being located downstream from a fiber working machine or a fiber material container that transports the fiber material to said weighing device, and said weighing device located upstream from a fiber working machine or a fiber material storage apparatus to which fiber material is transported from said weighing device, comprising:

at least two weighing arms, each of said weighing arms being rotationally supported on one end by an axle, said axle being stationarily fixed so as not to move in a vertical direction;

a feed apparatus located proximate to said rotationally supported end of one of said weighing devices;

a removal apparatus being located proximate to said rotationally supported end of another of said weighing arms; and a separate respective weighing element supporting the end of said weighing arms opposite from the end of said weighing arms that are rotationally supported, wherein a signal from each of said weighing elements is used to compute a total weight of the fiber material transported over said weighing arms.

9. The weighing device of claim 8, wherein said weighing arms linkably engage said weighing element.

10. The weighing device of claim 8, further comprising a transport belt located on each of said weighing arms, said transport belt accepts the fiber material from said feed apparatus, and said transport belt transports the feed material to said removal apparatus.

11. The weighing device of claim 10, wherein each of said transport belts has a turn-around roll on each of said weighing arms, and said weighing arms are rotatable about the axis of said respective turn-around roll.

12. The weighing device of claim 8, wherein each of said weighing arms has compensating balance to counterbalance the weight of said weighing arms.

13. The weighing device of claim 12, wherein each of said compensating balance has a compensation weight to compensate for the weight of said weighing arms.

14. The weighing device of claim 8, wherein each said axle is supported on a stationary knife edge support.

* * * * *